United States Patent
Winter et al.

(10) Patent No.: US 7,996,389 B2
(45) Date of Patent: Aug. 9, 2011

(54) METHOD AND APPARATUS FOR SEARCHING A DATABASE IN TWO SEARCH STEPS

(75) Inventors: Marco Winter, Hannover (DE); Uwe Janssen, Seelze (DE); Wolfgang Klausberger, Hannover (DE); Hui Li, Hannover (DE); Dietmar Hepper, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 1042 days.

(21) Appl. No.: 10/584,654

(22) PCT Filed: Nov. 15, 2004

(86) PCT No.: PCT/EP2004/012933
§ 371 (c)(1),
(2), (4) Date: Jun. 26, 2006

(87) PCT Pub. No.: WO2005/069162
PCT Pub. Date: Jul. 28, 2005

(65) Prior Publication Data
US 2009/0018997 A1    Jan. 15, 2009

(30) Foreign Application Priority Data
Jan. 6, 2004   (DE) .......................... 10 2004 001 212

(51) Int. Cl.
*G06F 17/30* (2006.01)
(52) U.S. Cl. ........................................................ 707/720
(58) Field of Classification Search .................. 707/713, 707/720
See application file for complete search history.

(56) References Cited

U.S. PATENT DOCUMENTS

| | | | | |
|---|---|---|---|---|
| 4,845,697 | A * | 7/1989 | Giddings | 369/43 |
| 5,515,475 | A | 5/1996 | Gupta et al. | |
| 5,822,284 | A | 10/1998 | Nishizawa | |
| 5,828,902 | A * | 10/1998 | Tanaka et al. | 710/39 |
| 5,850,547 | A * | 12/1998 | Waddington et al. | 718/102 |
| 6,073,095 | A | 6/2000 | Dharanipragada et al. | |
| 6,249,784 | B1 * | 6/2001 | Macke et al. | 707/3 |
| 6,304,878 | B1 * | 10/2001 | Karlov et al. | 707/102 |
| 6,760,542 | B1 * | 7/2004 | Saeijs et al. | 386/125 |

(Continued)

FOREIGN PATENT DOCUMENTS

EP    1128282    8/2001

OTHER PUBLICATIONS

Wunsch et al, "Registration of CAD models to Images by Iterative Inverse Perspective Matching Pattern Recognition", Aug. 25, 1996, Pattern Recognition 1996, <Retrieved from IEEE Explore May 11, 2009>.*

(Continued)

*Primary Examiner* — Khanh Pham
(74) *Attorney, Agent, or Firm* — Robert D. Shedd; Joseph J. Opalach; Reitseng Lin

(57) ABSTRACT

Search in stocks of data, particularly on optical media, is intended to be optimized in terms of the time required for the search. It is therefore proposed that the search be carried out in two steps. In a first search step, the entire database is scanned on the disk storage medium. In a second search step, executed in parallel, intermediate results from the first search step are searched. This allows the number of skips on a disk to be reduced, which results in increases of speed, particularly in the case of optical drives.

20 Claims, 1 Drawing Sheet

U.S. PATENT DOCUMENTS

| | | | | |
|---|---|---|---|---|
| 7,234,645 | B2 * | 6/2007 | Silverbrook et al. | 235/494 |
| 7,487,141 | B1 * | 2/2009 | Stephan | 707/3 |
| 2003/0200404 | A1 * | 10/2003 | Wicki et al. | 711/156 |
| 2004/0117037 | A1 * | 6/2004 | Hinshaw et al. | 700/2 |
| 2005/0149513 | A1 * | 7/2005 | Karlsson | 707/3 |
| 2005/0154723 | A1 * | 7/2005 | Liang | 707/3 |
| 2006/0029370 | A1 * | 2/2006 | Takada et al. | 386/94 |
| 2006/0161492 | A1 * | 7/2006 | Bettis et al. | 705/35 |

OTHER PUBLICATIONS

Graves, "A Multiechelon Inventory Model with Fixed Replenishment Intervals", Jan. 1996, Management Science, vol. 24, No. 1, p. 1-18, <Retrieved from JSTOR May 11, 2009>.*

Johne et al, "New service development: a review of the literature and annotated bibliography", 1998, European Journal of Marketing, vol. 32, Iss. 3/4, 45 pages, <Retrieved from ProQuest May 11, 2009>.*

* cited by examiner

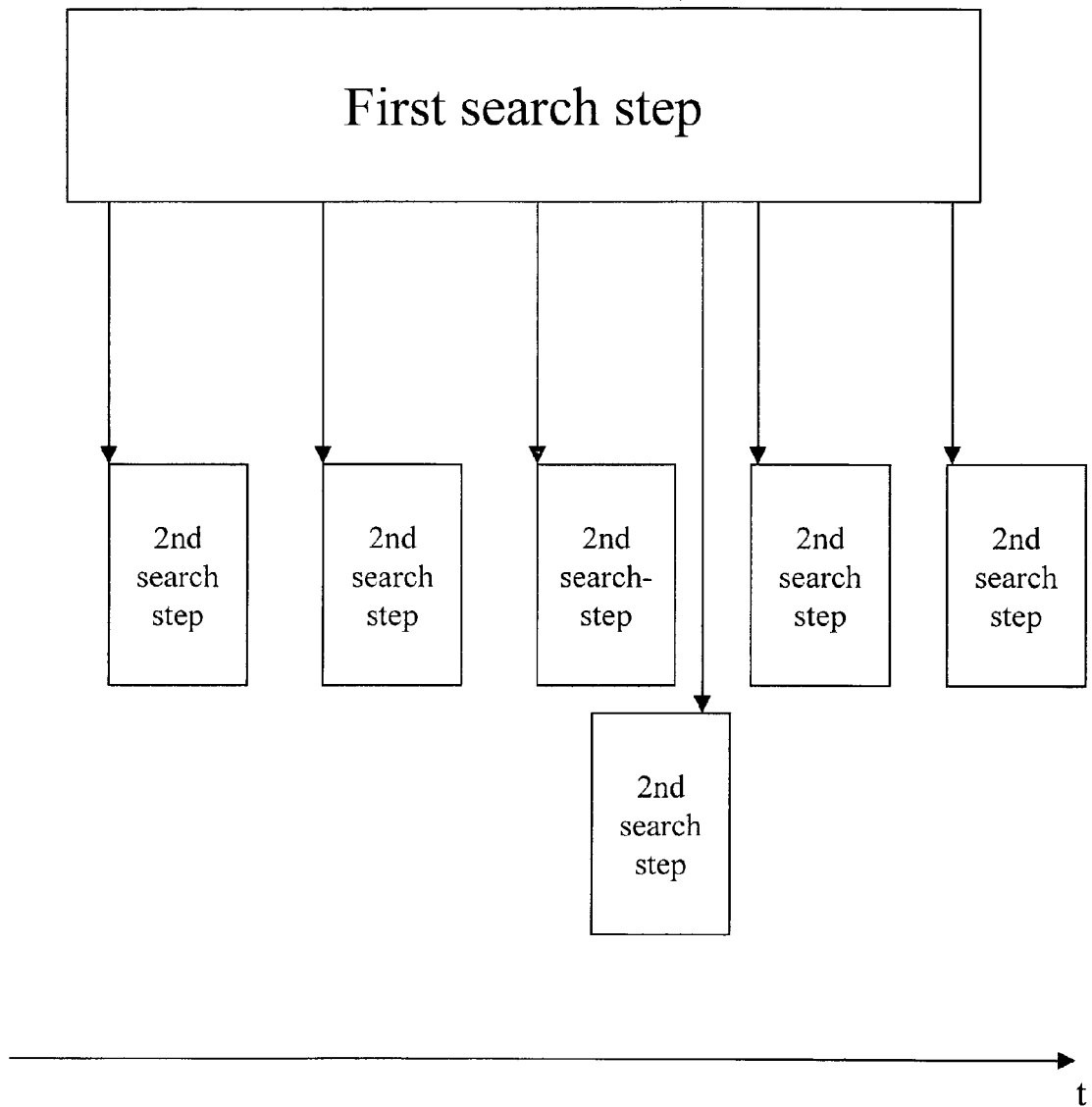

METHOD AND APPARATUS FOR SEARCHING A DATABASE IN TWO SEARCH STEPS

This application claims the benefit, under 35 U.S.C. §365 of International Application PCT/EP04/012933, filed Nov. 15, 2004, which was published in accordance with PCT Article 21(2) on Jul. 28, 2005 in English and which claims the benefit of German patent application No. 102004001212.1, filed Jan. 6, 2004.

BACKGROUND OF THE INVENTION

1. Field of Invention

The present invention relates to a method for searching a database on a disk storage medium, particularly a CD-ROM or DVD-ROM. The present invention also relates to a corresponding apparatus for searching a database.

2. Description of Related Art

Database systems normally access a fixed or dynamic stock of data. This stock of data is normally stored on a hard disk. Sometimes, the data are also stored in a ROM, as is the case with T9 voice databases for mobile telephones. In addition, it is known practice for telephone books, for example, to be stored on CD- or DVD-ROMs.

Currently, however, dynamic databases are not stored on optical media. The reason for this is the relatively long skip times for the limited number of rewrite cycles on an optical medium in comparison with a hard disk. Complex search queries are therefore very time-consuming on optical media.

BRIEF SUMMARY OF THE INVENTION

The object of the present invention is therefore to optimize the searching of databases, particularly on optical media.

The invention achieves this object by means of a method for searching a database on a disk storage medium by executing a first search step which is used to scan the entire database on the disk storage medium, providing an intermediate result from the first search step, executing a second search step in the intermediate result from the first search step, and providing an end result from the second search step.

The invention also provides an apparatus for searching a database on a disk storage medium having a search device for executing a first search step which can be used to scan the entire database on the disk storage medium, and a memory device for storing and providing an intermediate result from the first search step, where the search device is also designed to execute a second search step in the intermediate result from the first search step and to provide an end result from the second search step.

The invention is based on the concept of the search requiring as few skips as possible to be made by the read head on the disk storage medium, particularly the optical disk. This allows the search time to be minimized significantly, since thorough search operations for refining the first search step no longer require recourse to the disk, but rather access to a fast memory device is possible.

Preferably, the processing speed for the data in the first search step is at least as high as the read-in speed for the data. This can be achieved by matching the search depth to the read-in speed. This means that the read operation on the disk during the first search step is not interrupted and there is no need for a time-consuming return skip.

The first search step may involve just a pattern search (pattern match) being performed. The pattern search can be executed very quickly in contrast to computation-intensive comparison operations, for example. If an index list is used for searching, it is advantageous if the first search step involves skipping to the search locations in descending or ascending order on the basis of sorting exclusively according to sector numbers. This measure also allows the average skip distance to be reduced.

The intermediate result obtained during the first search step may comprise one or more subresults which are respectively searched in the second search step. This means that, by way of example, the first search step can deliver individual subtrees which are thinned in the second search step according to specific elements.

In one preferred variant, the database is dynamic and is available in fragmented form, with the individual fragments being read in successively and a read head skipping exclusively in one direction between the fragments. This likewise prevents the number of skips from exceeding a requisite minimum. In particular, this also minimizes the skip distance, since the skips are made only in one direction.

For security reasons, the data on the disk storage medium are stored in ECC (Error Correction Code) blocks. It is all the more important in that case that the number of skips is reduced, since the ECC blocks always have to be read in full and a skip on the disk normally requires a subsequent movement to the start of a block.

Preferably, as already indicated, the disk storage medium is an optical disk, such as a CD or DVD. In the case of these optical disks, where the read head is moved very slowly as compared with hard disks, the inventive method can expect the greatest return.

BRIEF DESCRIPTION OF THE DRAWING

Some embodiments of apparatus and/or methods in accordance with the invention are now described, by way of example only, and with reference to the accompanying FIGURE in which:

the FIGURE shows the parallel flow of first and second search steps in an exemplary embodiment in accordance with the invention.

DETAILED DESCRIPTION OF THE INVENTION

The exemplary embodiment outlined in more detail below is a preferred embodiment of the present invention.

The invention achieves a full search of a database on a disk by virtue of a first process (thread) making a full search through the stock of data and, in so doing, performing a (from the point of view of the processor power) simple, coarse and rapid search in a first search step. In this case, the stock of data is searched as continuously as possible on the disk from the point of view of sector numbering. This saves arduous pick-up skips by the drive.

Every search hit is then forwarded to a second search step. This means that the suitable data are transferred from the first search step to the second search step, i.e. from the first process to a second process executed in parallel. The first search step does not wait for the result from the second search step, i.e. it continues its coarse search immediately.

The second search step is responsible for more complex search tasks, such as comparisons, which may require more CPU computation power. This search process is then performed independently of the coarse search in a separate parallel second process (thread).

This division is of particular interest, by way of example, for hierarchy text-based databases, such as XML databases. A search query to such databases frequently comprises text, element names and attribute names. By way of example, the search query could be: search a music database for the track "Wonderful tonight" by Eric Clapton. The first search step then searches the stored stock of data in a fast text scan. In the specific example, the music database is searched for hits relating to the singer "Eric Clapton" and hits relating to the track "Wonderful tonight". This is a type of search which requires only limited computation power. The computation power required varies according to the level of error tolerance with which the text search is to be performed, and whether searching is meant to be case-insensitive, for example.

Ultimately, the available computation power is limited. It is utilized for a coarse, rapid and continuous scan of the stock of data. In this regard, it will be noted that although an optical disk requires a very long time to skip from one sector to another arbitrary sector on the disk (up to one second) in comparison with a hard disk, the continuous reading-in of consecutive disk sectors is only slightly slower than in the case of a hard disk. Consequently, this continuous scan of the stock of data is intended to be utilized to the greatest possible extent. A prerequisite for this is that the coarse first search step does not over task the processor. This is achieved by virtue of the CPU requiring only little time for the processing in the first search step, which means that the drive or pick-up can deliver each sector of the stock of data to the first step immediately. Otherwise, an arduous return skip by the pick-up would in fact be enforced.

The coarse, first search therefore delivers probable hits, but no definite hits. In a specific example, the first search step would provide all entries in the music database containing "Eric Clapton" and/or "Wonderful tonight" as hits. This means that other numbers by Eric Clapton and other interpreters of the song being sought are also recorded as an intermediate result. These probable hits are forwarded directly to a second independent search process. This second search process provides the refined search, which is used to ascertain that this is actually a hit. This search process therefore performs the search part which implements a more complex search in terms of computation, such as complex XPath expressions, as are frequently used for XML databases. In the specific example, the hits for "Eric Clapton" are searched for the head word "Wonderful tonight" and vice versa. As end result, it is thus possible to present database entries which contain both the interpreter being sought and the track being sought.

The advantage of this two-stage procedure is that a preselective search process, which requires as little computation power as possible, searches the stock of data in a continuous scan process having reduced skips. As a result, a scan of the stock of data takes place at maximum speed. The second search process, executed with lower priority than the first search process, uses the remaining computation power in order to locate the ultimate hits.

This process already provides execution-time advantages for fixed stocks of data on CD-ROM and DVD-ROM. It is even more effective when the stock of data is available in fragmented form on the optical disk. This is the case with dynamic stocks of data, in particular.

Example

The first search step permits searching for XML element names, XML attribute names, XML element values (which is text) and XML attribute values (which is also text) and XML namespaces. In this example, logic combination between simultaneously sought search modules, such as logic AND functions and logic OR functions, are likewise possible on account of sufficient computation power. This means that the search depth in a first step is dependent on the available computation power. In other words, in this example individual hits can actually be logically combined in real time, i.e. at the same time as the data are being read in. This in turn means that the first search step is already of hierarchic design. The first search step then returns subtrees. These are elements, for example, which contain all demanded element names, attribute names and value texts.

In the second step, the search is refined, i.e. the more complex search requirements are implemented therein. These more complex search requirements are, by way of example, the order of elements, comparison operations and other logic dependencies which cannot be tested by the first search step.

The FIGURE shows the parallel flow of the search. While the first search step, symbolized by a continuous bar over time t, searches the entire stock of data without interruption, the second search step receives only the hits from the first search step. These are then searched in detail. The second search steps are separate CPU processes which use the remaining available computation power. The first search step is thus not disturbed. Since the first search step is generally the more time-consuming process on account of the properties of optical disks, it represents the bottleneck. In this process arrangement, therefore, steps are taken to prevent the process from being held up by transferring time-consuming examinations out of this process. It is thus possible to search with prescribed computation power at correspondingly maximum speed.

The search speed may also be increased by virtue of the data which are to be searched being stored on the optical medium in ascending sector sequence as far as possible.

The inventive search is advantageous particularly when no index lists are used for the search. If index lists are available, however, then a search using the index is frequently more appropriate. If the index list means that it is necessary to skip to various locations in the stock of data, however, then skipping to and searching the skip points from the index list should advantageously be effected on the basis of sorting which ascends to sector numbers, in order to reduce the skip times on average.

Since index lists are suitable only for specific search queries, practically every database will be reliant on a full search for particular complex search queries, which means that the present invention may likewise be used for any database.

In summary, it may thus be stated that the greatest benefit of the present invention can be achieved in the case of appliances with optical drives, which have longer skip times and permit rapid reading of cohesive sectors. The large stocks of data on these optical media may then be searched at very high speed with limited computation power. Continuous reading in ascending sector numbers reads ECC (Error Correction Code) blocks entirely and scans all sectors which are relevant to the database. In the case of DVDs, the ECC blocks comprise 16 sectors of 2048 bits, and in the case of Blue-Ray disks they comprise 32 sectors of 2048 bits. These blocks need to be read in full in order to be able to inspect even just a single sector. To this end, Blue-Ray disks require approximately a whole disk revolution in the internal radius, for example. Hence, arbitrary skips over the entire disk should be the exception and can essentially be avoided by the present invention.

The inventive principle is naturally also suitable for stocks of data on hard disks. In that case, the advantage which can be expected is small, however, since the average skip times are several orders of magnitude shorter than in the case of optical disks. In addition, the sectors on a hard disk are not packed into ECC blocks.

The invention claimed is:

1. A method for searching a database on a disk storage medium, comprising
   executing with a processor a first search step, the first search step including reading-in disk sectors of the disk storage medium and searching database records stored in said disk sectors read-in, wherein the searching is performed with a search depth dependent on an available computational power of the processor and matched to a speed of the reading-in of disk sectors such that the reading-in of disk sectors is not interrupted,
   providing an intermediate result from the first search step,
   executing with the processor a second search step in the intermediate result from the first search step, wherein executing the second search step uses the available computational power of the processor which is remaining from executing the first search step, and
   providing an end result from the second search step.

2. The method according to claim 1, wherein the processing speed in the first search step is at least as high as the read-in speed.

3. The method according to claim 1, wherein only a text search is performed in the first search step.

4. The method according to claim 1, wherein the first search step involves skipping to search locations from an index list in descending or ascending order on the basis of sorting exclusively according to sector numbers of the disk sectors.

5. The method according to claim 1, wherein the intermediate result comprises one or more subresults which are respectively searched in the second search step.

6. The method according to claim 1, wherein the database is dynamic and is available in fragmented form and in this context the individual fragments are read in successively and a read head skips exclusively in one direction between the fragments.

7. The method according to claim 1, wherein data are stored on the disk storage medium in ECC blocks.

8. The method according to claim 1, wherein the disk storage medium is an optical disk.

9. The method of claim 1, wherein the first and second search steps are executed at least partly in parallel.

10. The method of claim 9, wherein the second search step is executed with lower priority than the first search step.

11. An apparatus for searching a database on a disk storage medium, comprising
    a processor for executing a first search step, the first search step including reading-in disk sectors of the disk storage medium and searching database records stored in said disk sectors read-in, wherein the searching is performed with a search depth dependent on an available computational power of the processor and matched to a speed of the reading-in of disk sectors such that the reading-in of disk sectors is not interrupted, and
    a memory device for storing and providing an intermediate result from the first search step, where
    the processor is also designed to execute a second search step in the intermediate result from the first search step and to provide an end result from the second search step, wherein executing the second search step uses the available computational power of the processor which is remaining from executing the first search step.

12. The apparatus according to claim 11, wherein the processing speed in the first search step is at least as high as the maximum or an instantaneous read-in speed.

13. The apparatus according to claim 11, wherein an exclusive text search can be performed in the processor during the first search step.

14. The apparatus according to claim 11, wherein the first search step may involve the processor skipping to search locations from an index list in descending or ascending order on the basis of sorting exclusively according to sector numbers of the disk sectors.

15. The apparatus according to claim 11, wherein the intermediate result which can be stored in the memory device comprises one or more subresults which can be searched by the processor in the second search step.

16. The apparatus according to claim 11, wherein the database is dynamic and is available in fragmented form and in this context the individual fragments can be read into the processor successively and a read head can skip exclusively in one direction between the fragments.

17. The apparatus according to claim 11, wherein the processor and the memory device are suitable for processing ECC blocks.

18. The apparatus according to claim 11, wherein the disk storage medium is an optical disk.

19. The apparatus of claim 11, wherein the first and second search steps are executed at least partly in parallel.

20. The apparatus of claim 19, wherein the second search step is executed with lower priority than the first search step.

* * * * *